US010324951B1

(12) United States Patent
Miller et al.

(10) Patent No.: US 10,324,951 B1
(45) Date of Patent: Jun. 18, 2019

(54) TRACKING AND VIEWING MODEL CHANGES BASED ON TIME

(71) Applicant: Apptio, Inc., Bellevue, WA (US)

(72) Inventors: Michaeljon Miller, Bellevue, WA (US); Ioan Bogdan Crivat, Woodinville, WA (US)

(73) Assignee: Apptio, Inc., Bellevue, WA (US)

(*) Notice: Subject to any disclaimer, the term of this patent is extended or adjusted under 35 U.S.C. 154(b) by 0 days.

(21) Appl. No.: 15/859,058

(22) Filed: Dec. 29, 2017

(51) Int. Cl.
G06F 17/30 (2006.01)
G06F 16/26 (2019.01)
G06F 16/22 (2019.01)
G06F 16/28 (2019.01)
G06F 16/23 (2019.01)

(52) U.S. Cl.
CPC .............. *G06F 16/26* (2019.01); *G06F 16/22* (2019.01); *G06F 16/2365* (2019.01); *G06F 16/288* (2019.01)

(58) Field of Classification Search
CPC ......... G06F 17/30572; G06F 17/30312; G06F 17/30371
See application file for complete search history.

(56) References Cited

U.S. PATENT DOCUMENTS

| 4,744,026 | A | 5/1988 | Vanderbei |
| 5,249,120 | A | 9/1993 | Foley |
| 5,615,121 | A | 3/1997 | Babayev et al. |
| 5,721,919 | A | 2/1998 | Morel et al. |
| 5,758,327 | A | 5/1998 | Gardner et al. |
| 5,799,286 | A | 8/1998 | Morgan et al. |
| 5,802,508 | A | 9/1998 | Morgenstern |
| 5,903,453 | A | 5/1999 | Stoddard, II |
| 5,970,476 | A | 10/1999 | Fahey |
| 5,991,741 | A | 11/1999 | Speakman et al. |
| 6,014,640 | A | 1/2000 | Bent |
| 6,032,123 | A | 2/2000 | Jameson |
| 6,047,290 | A | 4/2000 | Kennedy et al. |
| 6,208,993 | B1 | 3/2001 | Shadmon |

(Continued)

FOREIGN PATENT DOCUMENTS

JP 2011134268 A 7/2011

OTHER PUBLICATIONS

"Activity Based Costing is the best allocation methodology," APPTIO, Community for Technology Business Management, Mar. 16, 2010, 2 pages.

(Continued)

*Primary Examiner* — Loc Tran
(74) *Attorney, Agent, or Firm* — John W. Branch; Lowe Graham Jones PLLC

(57) ABSTRACT

Embodiments are directed towards managing changes to data. A modeling engine may provide a data model based on objects comprised of one or more versions of one or more properties. Each version of the properties may be associated with separate validity ranges over time during which each version is valid. A report for visualizing the data model at a point-in-time may be provided. One or more report values may be provided based on each version of the properties that have a validity range that includes the point-in-time. The report may be displayed to provide provides one or more visualizations based on the one or more report values.

24 Claims, 12 Drawing Sheets

(56) References Cited

U.S. PATENT DOCUMENTS

| | | |
|---|---|---|
| 6,249,769 B1 | 6/2001 | Ruffin et al. |
| 6,253,192 B1 | 6/2001 | Corlett et al. |
| 6,308,166 B1 | 10/2001 | Breuker et al. |
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 8/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,769,654 B1 | 8/2010 | Hurewitz |
| 7,774,458 B2 | 8/2010 | Trinon et al. |
| 7,783,759 B2 | 8/2010 | Eilam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,175,863 B1 | 5/2012 | Ostermeyer et al. |
| 8,195,524 B2 | 6/2012 | Sandholm et al. |
| 8,200,518 B2 | 6/2012 | Bailey et al. |
| 8,200,561 B1 | 6/2012 | Scott et al. |
| 8,209,218 B1 | 6/2012 | Basu et al. |
| 8,260,959 B2 | 9/2012 | Rudkin et al. |
| 8,370,243 B1 | 2/2013 | Cernyar |
| 8,396,775 B1 | 3/2013 | Mindlin |
| 8,423,428 B2 | 4/2013 | Grendel et al. |
| 8,484,355 B1 | 7/2013 | Lochhead et al. |
| 8,543,438 B1 | 9/2013 | Fleiss |
| 8,600,830 B2 | 12/2013 | Hoffberg |
| 8,601,263 B1 | 12/2013 | Shankar et al. |
| 8,655,714 B2 | 2/2014 | Weir et al. |
| 8,667,385 B1 | 3/2014 | Mui et al. |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 | 12/2015 | French et al. |
| 9,281,012 B2 | 3/2016 | Hedges |
| 9,384,511 B1 | 7/2016 | Purpus |
| 9,529,863 B1 | 12/2016 | Gindin et al. |
| 9,805,311 B1 | 10/2017 | Mohler |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1 | 6/2002 | Vellante et al. |
| 2002/0082966 A1 | 6/2002 | O'Brien et al. |
| 2002/0107914 A1 | 8/2002 | Charisius et al. |
| 2002/0123945 A1 | 9/2002 | Booth et al. |
| 2002/0145040 A1 | 10/2002 | Grabski |
| 2002/0156710 A1 | 10/2002 | Ryder |
| 2002/0178198 A1 | 11/2002 | Steele |
| 2002/0194329 A1 | 12/2002 | Alling |
| 2003/0019350 A1 | 1/2003 | Khosla |
| 2003/0074269 A1 | 4/2003 | Viswanath |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0111509 A1 | 6/2004 | Eilam et al. |
| 2004/0133876 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |

(56) References Cited

U.S. PATENT DOCUMENTS

| | | |
|---|---|---|
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0179975 A1 | 8/2007 | Teh et al. |
| 2007/0198317 A1 | 8/2007 | Harthcryde et al. |
| 2007/0198982 A1 | 8/2007 | Bolan et al. |
| 2007/0214413 A1 | 9/2007 | Boeckenhauer |
| 2007/0226090 A1 | 9/2007 | Stratton |
| 2007/0260532 A1 | 11/2007 | Blake, III |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 6/2009 | Tsern et al. |
| 2009/0198535 A1 | 8/2009 | Brown et al. |
| 2009/0199192 A1 | 8/2009 | Laithwaite et al. |
| 2009/0216580 A1 | 8/2009 | Bailey et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0225277 A1 | 9/2011 | Freimuth et al. |
| 2011/0295766 A1 | 12/2011 | Tompkins |
| 2011/0313947 A1 | 12/2011 | Grohovaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan et al. |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041819 A1 | 2/2013 | Khasho |
| 2013/0060595 A1 | 3/2013 | Bailey |
| 2013/0066866 A1* | 3/2013 | Chan ................ G06F 16/2477 707/732 |
| 2013/0091456 A1 | 4/2013 | Sherman et al. |
| 2013/0091465 A1 | 4/2013 | Kikin-Gil et al. |
| 2013/0103654 A1 | 4/2013 | McLachlan et al. |
| 2013/0124454 A1* | 5/2013 | Bhide ................ G06F 16/254 707/602 |
| 2013/0124459 A1 | 5/2013 | Iwase et al. |
| 2013/0138470 A1 | 5/2013 | Goyal et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0288987 A1 | 9/2014 | Liu |
| 2014/0351166 A1 | 11/2014 | Schlossberg |
| 2014/0365503 A1 | 12/2014 | Franceschini et al. |

(56) References Cited

U.S. PATENT DOCUMENTS

| | | |
|---|---|---|
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0302303 A1 | 10/2015 | Hakim |
| 2015/0341230 A1 | 11/2015 | Dave et al. |
| 2018/0068246 A1 | 3/2018 | Crivat et al. |

OTHER PUBLICATIONS

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wkipedia, the free encyclopedia, accessed Mar. 13, 2012, 10 pages http://en.wikipedia.org/wiki/Program_Evaluation_and_Review_Technique—last modified Mar. 12, 2012.

"Project Management," Wkipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 dated Jul. 14, 2010, 12 pages.

International Preliminary Report on Patentability for International Patent Application No. PCT/US2010/035021 dated Nov. 24, 2011, 10 pages.

International Search Report and Written Opinion for International Patent Application No. PCT/US2012/028353 dated Oct. 31, 2012, 9 pages.

International Preliminary Report on Patentability for International Patent Application No. PCT/US2012/028353 dated Sep. 19, 2013, 6 pages.

International Search Report and Written Opinion for International Patent Application No. PCT/US2012/028378 dated Sep. 12, 2012, 11 pages.

International Preliminary Report on Patentability for International Patent Application No. PCT/US2012/028378 dated Sep. 19, 2013, 7 pages.

Extended European Search Report in EP Application No. 13151967.0-1955, dated Apr. 19, 2013, 8 pages.

Official Communication for U.S. Appl. No. 12/467,120 dated Oct. 4, 2011, 12 pages.

Official Communication for U.S. Appl. No. 12/467,120 dated Jun. 20, 2012, 17 pages.

Official Communication for U.S. Appl. No. 12/467,120 dated Aug. 29, 2012, 3 pages.

Official Communication for U.S. Appl. No. 12/467,120 dated Oct. 23, 2013, 21 pages.

Official Communication for U.S. Appl. No. 12/467,120 dated Mar. 26, 2013, 18 pages.

Official Communication for U.S. Appl. No. 13/324,253 dated Sep. 25, 2012, 17 pages.

Official Communication for U.S. Appl. No. 13/324,253 dated Jan. 10, 2013, 20 pages.

Official Communication for U.S. Appl. No. 13/324,253 dated Mar. 19, 2013, 3 pages.

Official Communication for U.S. Appl. No. 13/324,253 dated Sep. 6, 2013, 21 pages.

Official Communication for U.S. Appl. No. 13/415,797 dated Oct. 3, 2013, 17 pages.

Official Communication for U.S. Appl. No. 13/452,628 dated Apr. 22, 2013, 11 pages.

Official Communication for U.S. Appl. No. 13/675,837 dated Oct. 10, 2013, 41 pages.

Official Communication for U.S. Appl. No. 13/837,815 dated Oct. 23, 2013, 9 pages.

Official Communication for U.S. Appl. No. 13/917,478 dated Nov. 7, 2013, 15 pages.

Official Communication for U.S. Appl. No. 13/917,503 dated Oct. 10, 2013, 41 pages.

Official Communication for U.S. Appl. No. 13/935,147 dated Oct. 22, 2013, 16 pages.

Office Communication for U.S. Appl. No. 13/649,019 dated Sep. 23, 2015, 15 pages.

Office Communication for U.S. Appl. No. 13/365,150 dated Sep. 24, 2015, 15 pages.

Office Communication for U.S. Appl. No. 14/033,130 dated Sep. 15, 2015, 22 pages.

Official Communication for U.S. Appl. No. 13/452,628 dated Jan. 12, 2016, 21 pages.

Official Communication for U.S. Appl. No. 13/649,019 dated Jan. 4, 2016, 8 pages.

European Examination Report for Application No. 14159413.5 dated Jul. 15, 2015, 9 pages.

Office Communication for U.S. Appl. No. 13/415,701 dated Oct. 27, 2015, 16 pages.

Official Communication for U.S. Appl. No. 14/869,721 dated Jan. 13, 2016, 57 pages.

Office Communication for U.S. Appl. No. 13/675,837 dated Oct. 26, 2015, 20 pages.

Office Communication for U.S. Appl. No. 13/917,503 dated Oct. 22, 2015, 19 pages.

Office Communication for U.S. Appl. No. 14/722,663 dated Dec. 1, 2015, 37 pages.

Official Communication for U.S. Appl. No. 13/452,628 dated Nov. 18, 2013, 15 pages.

(56) References Cited

OTHER PUBLICATIONS

Official Communication for U.S. Appl. No. 14/033,130 dated Dec. 16, 2013, 15 pages.
Official Communication for U.S. Appl. No. 13/324,253 dated Jan. 23, 2014, 15 pages.
Official Communication for U.S. Appl. No. 13/675,837 dated Jan. 31, 2014, 37 pages.
Official Communication for U.S. Appl. No. 13/917,503 dated Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServicesloptimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?
Cost Optimisation with Amazon Web Services, extracted slides, Slideshare Jan. 30, 2012 http://www.sideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,306 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015, 14 pages.
European Search Report for Application No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No. 13/415,797 dated Oct. 19, 2015, 3 pages.
Official Communication for U.S. Appl. No. 13/837,815 dated Sep. 28, 2015, 20 pages.
Chien-Liana Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software,"Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.

(56) References Cited

OTHER PUBLICATIONS

Office Communication for U.S. Appl. No. 13/837,815, dated Apr. 13, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Official Communication for U.S. Appl. No. 14/867,552 dated Oct. 3, 2016, 19 pages.
Office Communication for U.S. Appl. No. 13/837,815 dated Jun. 23, 2016, 3 pages.
Office Communication for U.S. Appl. No. 14/033,130 dated Apr. 25, 2016, 4 pages.
Office Communication for U.S. Appl. No. 14/846,349 dated Jul. 1, 2016, 24 pages.
Office Communication for U.S. Appl. No. 14/869,721 dated Jun. 1, 2016, 35 pages.
Office Communication for U.S. Appl. No. 14/971,944 dated May 19, 2016, 17 pages.
Office Communication for U.S. Appl. No. 14/977,368 dated Jun. 7, 2016, 11 pages.
Office Communication for U.S. Appl. No. 14/981,747 dated Jul. 14, 2016, 29 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/180,308 dated May 25, 2017, 21 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/365,150 dated Aug. 23, 2017, 30 pages.
Official Communication for U.S. Appl. No. 15/260,221 dated Aug. 15, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/935,147 dated Nov. 3, 2017, 11 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 15/351,313 dated Jul. 18, 2017, 15 pages.
Official Communication for U.S. Appl. No. 15/351,313 dated Jan. 12, 2017, 7 pages.
Official Communication for U.S. Appl. No. 13/837,815 dated Jan. 26, 2018, 12 pages.
Official Communication for U.S. Appl. No. 13/935,147 dated Jan. 17, 2018, 3 pages.
Official Communication for U.S. Appl. No. 14/869,721 dated Jan. 19, 2018, 3 pages.
Official Communication for U.S. Appl. No. 14/667,552 dated Feb. 13, 2018, 3 pages.

(56) References Cited

OTHER PUBLICATIONS

Official Communication for U.S. Appl. No. 14/846,349 dated Jan. 18, 2018, 29 pages.
Official Communication for U.S. Appl. No. 14/867,552 dated Feb. 13, 2018, 3 pages.
Official Communication for U.S. Appl. No. 15/859,008 dated Mar. 5, 2018, 20 pages.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 14/180,308 dated Aug. 6, 2018, pp. 1-23.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 13/935,147 dated Apr. 5, 2018, pp. 1-14.
Official Communication for U.S. Appl. No. 14/867,552 dated May 31, 2018, pp. 1-22.
Official Communication for U.S. Appl. No. 15/858,945 dated Apr. 4, 2018, pp. 1-74.

* cited by examiner

| Position | Count | Cost |
|---|---|---|
| ... | ... | ... |
| SW Lead | 3 | 285000 |
| SW Eng | 8 | 640000 |
| ... | ... | ... |
| Total | | |

| Position | Count | Cost |
|---|---|---|
| ... | ... | ... |
| SW Lead | 4 | 38000 |
| SW Eng | 10 | 800000 |
| ... | ... | ... |
| Total | | |

TRACKING AND VIEWING MODEL CHANGES BASED ON TIME

TECHNICAL FIELD

The present invention relates generally to computer automated activity based resource allocation modeling over time, and more particularly, but not exclusively to visualizations of resource allocation information over selected periods of time.

BACKGROUND

Organizations employ various models to allocate resources over time. For some resource allocation techniques, the complexity and accuracy of the underlying data models may change over time as the number of tracked activities are completed, repurposed or abandoned. Therefore, for larger organizations, computerized visualization tools are often required to assist in managing relevant resource models over time and predicting future resource allocations. In some cases, the large number of items and entities required for enterprise scale resource modeling over time may make resource models difficult to understand. Further, the complexity of the models and the modelled items and entities may make it difficult to compare efficiencies over time. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

Figure 1:
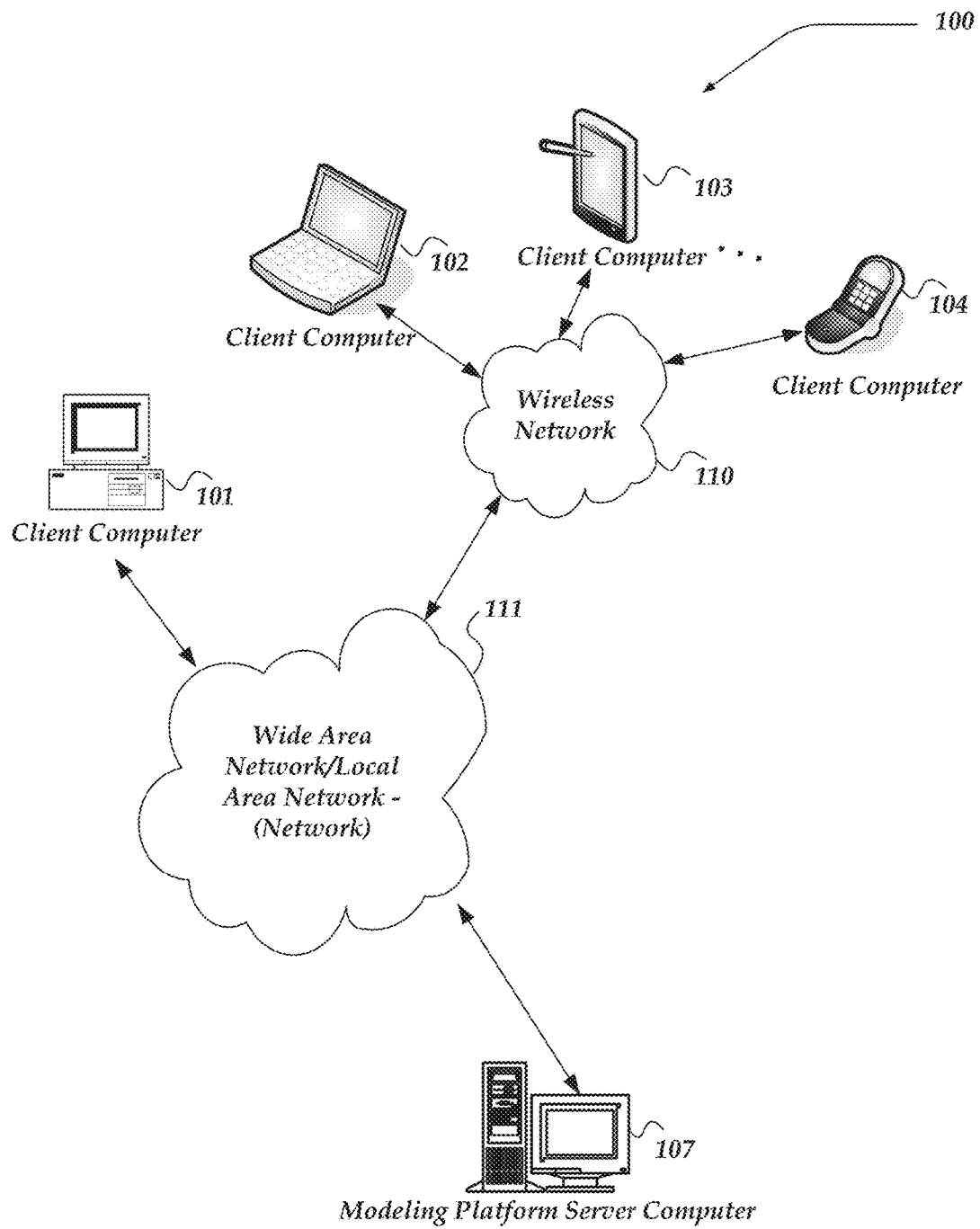
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources and/or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "data model," or "model object" refers to a set and/or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category and/or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. In some embodiments, datasets may be ingested to produce data model objects for data models. Non-tabular datasets can also take the form of marked up strings of characters, such as an XML file.

As used herein, the term "source object" refers to a model object in a data model that may be providing resource values that may be allocated to one or more other model objects (target objects).

As used herein, the term "target object" refers to a model object in a data model that may be allocated resources from one or more other model objects (source objects).

As used herein, the "validity range" refers to the time range that various model values are considered valid. Model values associated with validity ranges may vary depending on the application of the model, and may include, data object property value, object property set, line item property value, allocation rules, or the like. Validity ranges may be unbounded such that they have a start time but no defined end time.

As used herein, the term "validity start," "validity start time" refers to the beginning of validity range associated with a modeled object or item.

As used herein, the term "validity end," "validity end time" refers to the end of validity range associated with a modeled object or item.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards for models for visualizing resource allocation and for managing changes to data. In one or more of the various embodiments, a modeling engine may be instantiated to various perform actions, including: providing a data model that may be based on one or more objects such that each object may be comprised of one or more versions of one or more properties, and such that the one or more versions of each property may be stored in a same data structure in a same data store; and associating each version of the one or more properties with separate validity ranges over time during which each version is valid such that each separate validity range for each version of a same property may be disjoint from each other validity range of the same property.

In one or more of the various embodiments, the modeling engine may be arranged to perform further actions, including: receiving a new property value for a latest version of a property; associating an end time that corresponds to the receipt of the new property value with the latest version of the property, such that the end time indicates an end of a validity range that may be associated with the latest version of the property; providing a new version of the property that has the new property value; and associating a start time with the new version of the property, such that the start time may be adjacent in time to the end time and it may indicate a start of a validity range for when the new version of the property is valid.

In one or more of the various embodiments, the modeling engine may be arranged to perform further actions, including: providing the one or more versions of the one or more properties based on historical data; and providing one or more other versions of the one or more properties based on planning data, such that the one or more portions of the historical data and the planning data may be stored in the same data store and distinguished from each other by disjoint validity ranges.

In one or more of the various embodiments, the modeling engine performs further actions, including: allocating a first portion of computer memory to store each new version of a property of an object; preserving second portion of computer memory that stores prior versions of the property of the object; and preserving a third portion of computer memory that stores each version of one or more other properties of the object.

In one or more of the various embodiments, a report engine may be instantiated to perform various actions, including: providing a report for visualizing one or more portions of the data model at a point-in-time; providing one or more report values based on each version of the one or more properties that have a validity range that includes the point-in-time; and displaying the report on a hardware display, such that the report provides one or more visualizations based on the one or more report values.

In one or more of the various embodiments, the report engine may be arranged to provide one or more other report values based on other versions of the one or more properties that have one or more other validity ranges that may be valid at another point-in-time; and automatically updating the display of the report based on the one or more other report values.

In one or more of the various embodiments, the report engine may be arranged to perform further actions, including: providing one or more queries that may be associated with the report; modifying the one or more queries by including the point-in-time in the one or more queries; and employing the one or more queries to provide one or more values associated with the one or more versions of the one or more properties, such that the one or more values have a validity range that includes the point-in-time.

In one or more of the various embodiments, displaying the report, may include, including one or more of date formats, time formats, units, colors, fonts, punctuation, time zones, languages, currencies, or calendar formatting based on geo-location information provided by one or more sensors associated with a computer.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")—(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In one or more of the various embodiments, at least some of client computers 102-104 may operate over wired or wireless network. Today, many of these devices include a capability to access or otherwise communicate over a network such as network 111 or wireless network 110. Moreover, client computers 102-104 may access various computing applications, including a browser, or other web-based application.

In one or more of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one or more of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one or more of the various embodiments, a user of the client computer may employ the browser application to perform various actions over a network.

Client computers 101-104 also may include at least one other client application that is configured to receive or send data, including resource allocation information, report requests (e.g., queries) between another computing device. Client applications may include a capability to provide requests or receive data relating to the data models, reports, project information, allocation rules, or the like. The client application may provide data representing assignment or resource allocation changes, selecting reports, providing user information, selecting templates, editing cost allocations between or among categories, generating or modifying allocation rules, or the like. In one or more of the various embodiments, client applications may receive or generate data related to data models and may generate tables and relationships between and among the data. In one or more of the various embodiments, client computers 101-104 may view or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, or other communication protocols, architectures, models, or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
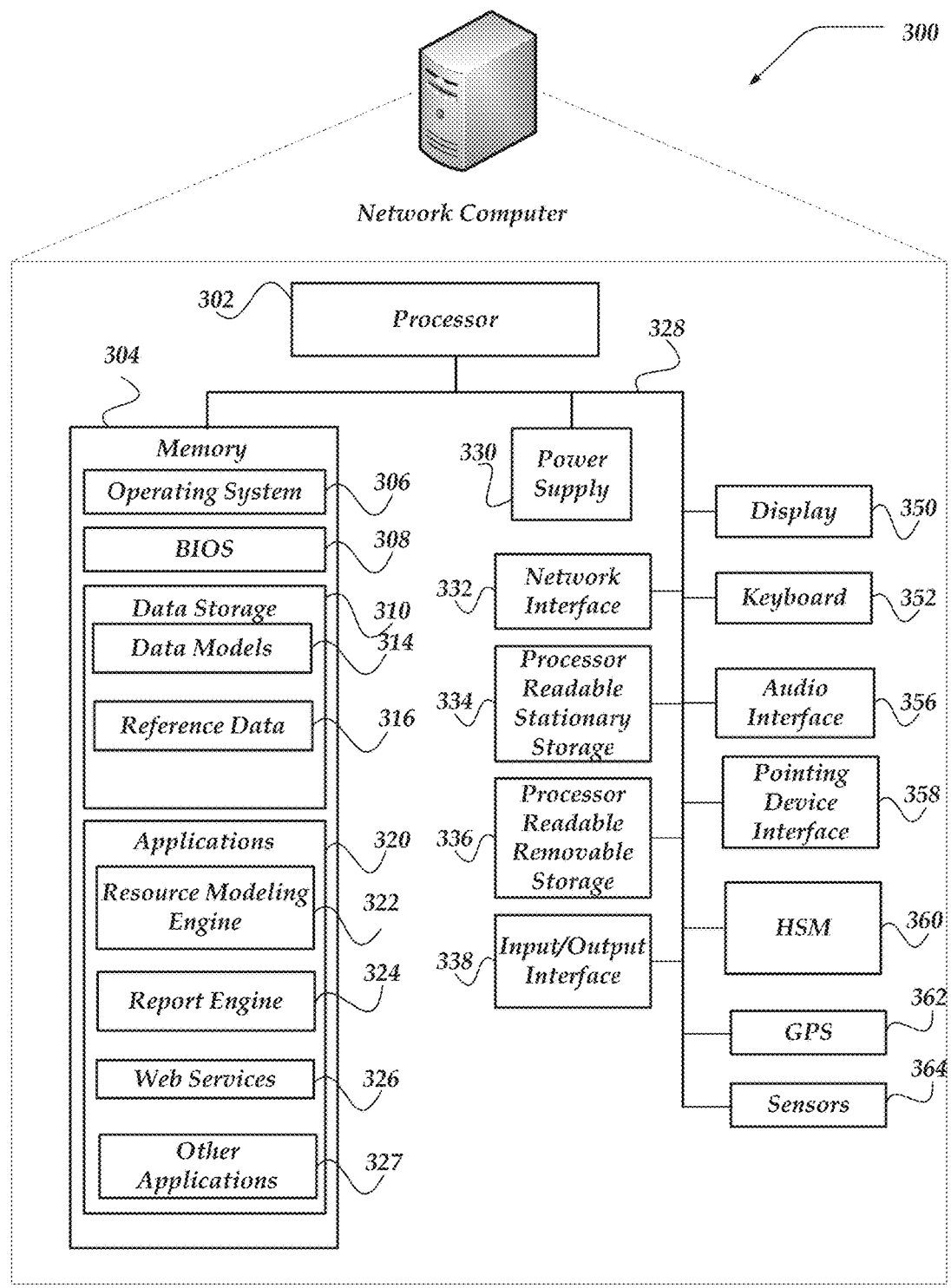
FIG. 3 illustrates one embodiment of a network computer that may be included in a system.

Modeling platform server computer 107 may include virtually any network computer usable to perform data processing operation that may be used for generating data models, allocation rules, recursive allocation rules, resource allocations, displays or reports thereof, such as network computer 300 of FIG. 3. In one or more of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, or the like. Furthermore, modeling platform server computer 107 may include or generate one or more reports for visualizing the generated resource allocations, data models, allocation rules, or the like.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in one or more of the various embodiments, modeling platform server computer 107 may be distributed over a plurality of network computers or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client Computer

Figure 2:
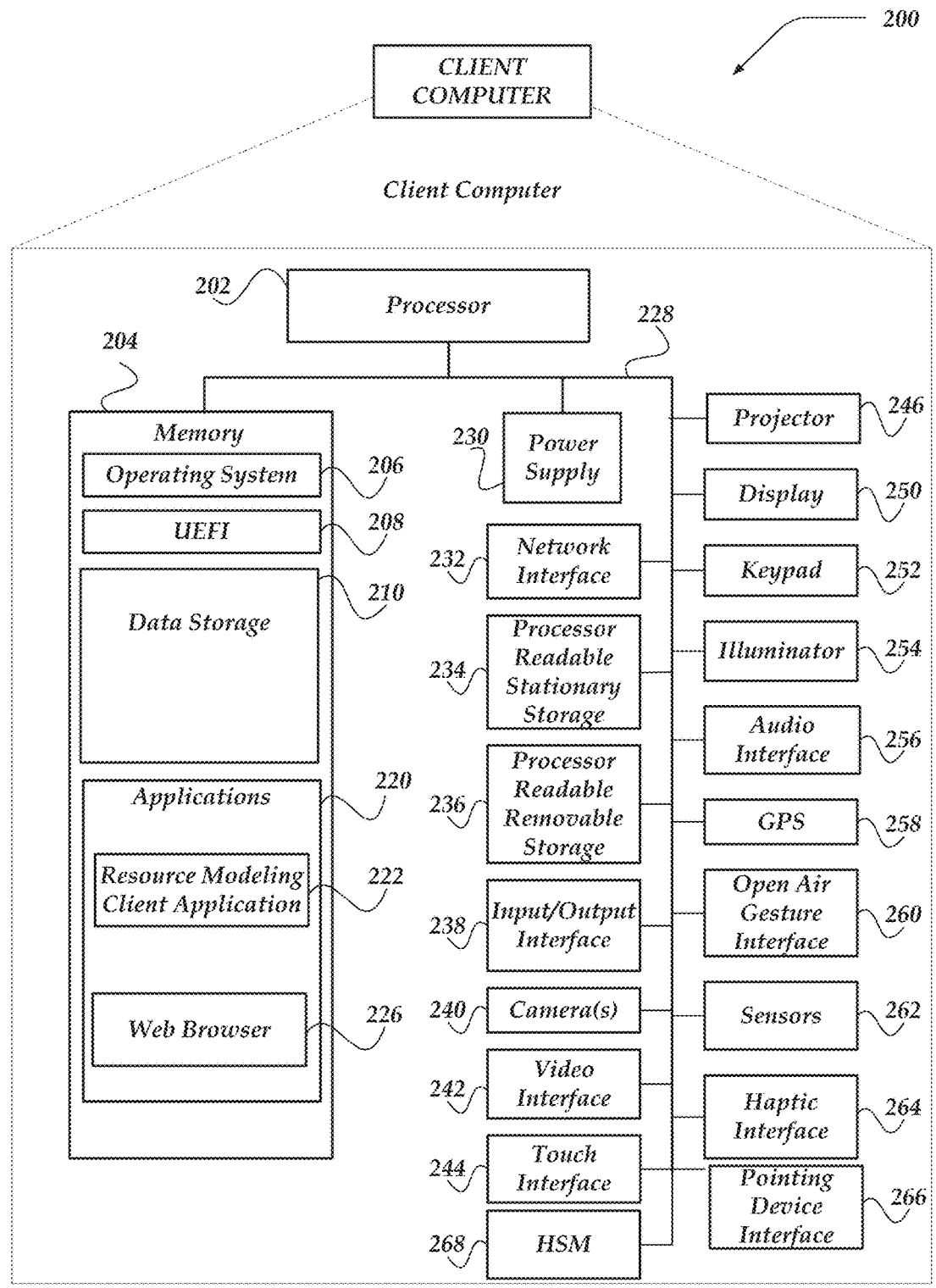
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In one or more of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In one or more of the various embodiments, applications, such as, operating system 206, resource modeling client application 222, web browser 226, or the like, may be arranged to employ geo-location information to select one or more localization features, such as, time zones, languages, currencies, calendar formatting, or the like. Localization features may be used in data objects, data models, reports, file systems, user-interfaces, as well as internal processes or databases. In one or more of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java or JavaScript virtual machine modules that enable control of hardware components or operating system operations via Java application programs or JavaScript programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, resource modeling client application 222. In one or more of the various embodiments, resource modeling client application 222 may be used to exchange communications to and from modeling platform server computer 107, including, but not limited to, queries, searches, API calls, reports, user information, configuration information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In one or more embodiment, the microcontrollers be system-on-a-chips (SOCs) that may directly execute their own embedded logic to perform actions and access their own internal memory and their own external Input and Output Interfaces (e.g., hardware pins or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In one or more embodiments, however, network computer 300 may, through other components, provide other information that may be employed to determine a physical location of the client computer, including for example, a Media Access Control (MAC) address, IP address, and the like.

In one or more of the various embodiments, applications, such as, operating system 306, resource modeling engine 322, report engine 324, web services 326, other applications 327, or the like, may be arranged to employ geo-location information to select one or more localization features, such as, date formats, time formats, units, colors, fonts, punctuation, time zones, languages, currencies, calendar formatting, or the like. Localization features may be used in data objects, data models, reports, file systems, user-interfaces, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 110 or network 111.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect or measure data that is external to network computer 300

In one or more embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of non-transitory computer readable or writeable media. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, reference data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, report engine 324, web services 326, other applications 327, or the like, that may perform actions further described below. In one or more of the various embodiments, one or more of the applications may be implemented as modules or components of another application. Further, in one or more of the various embodiments, applications may be implemented as operating system extensions, modules, plugins, or the like.

In one or more of the various embodiments, applications, such as, resource modeling engine 322, report engine 324, web services 326, other applications 327, or the like, may be arranged to employ geo-location information to select one or more localization features, such as, time zones, languages, currencies, calendar formatting, or the like. Localization features may be used in user-interfaces, reports, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 108 or network 111.

Furthermore, in one or more of the various embodiments, resource modeling engine 322, report engine 324, web services 326, other applications 327, or the like, may be operative in a cloud-based computing environment. In one or more of the various embodiments, these engines, and others, that comprise the modeling platform that may be executing within virtual machines or virtual servers that may be managed in a cloud-based based computing environment. In one or more of the various embodiments, in this context applications including the engines may flow from one physical network computer within the cloud-based environment to another depending on performance and scaling considerations automatically managed by the cloud computing environment. Likewise, in one or more of the various embodiments, virtual machines or virtual servers dedicated to resource modeling engine 322, report engine 324, web services 326, other applications 327, or the like, may be provisioned and de-commissioned automatically.

Further, in some embodiments, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In one or more embodiment, the one or more microcontrollers may directly execute embedded logic to perform actions and access their own internal memory and their own external Input and Output Interfaces (e.g., hardware pins or wireless transceivers) to perform actions. E.g., they may be arranged as Systems On Chips (SOCs).

In one or more of the various embodiments, resource modeling engine 322, report engine 324 may be instantiated to enable a user to generate project plans, allocation rules, data models, reports, what-if-analysis, or the like. Also in one or more of the various embodiments, resource modeling engine 322, report engine 324 may employ processes, or parts of processes, similar to those described below.

Illustrative Logical System Architecture

Figure 4:
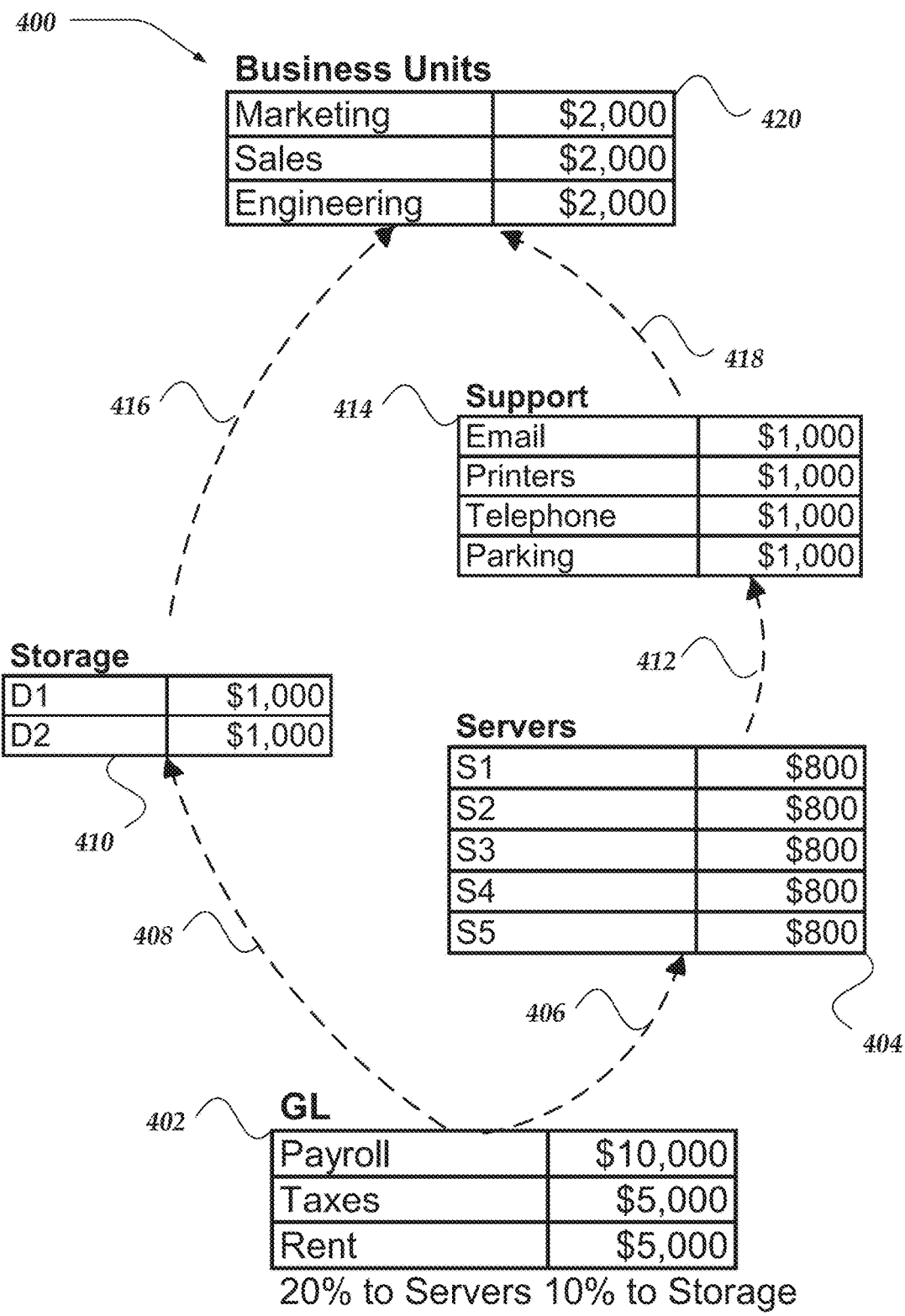
FIG. 4 illustrates a portion of a logical architecture for a data model that may be enabled by at least one of the various embodiments.

FIG. 4 illustrates a portion of a logical architecture for data model 400 that may be enabled by at least one of the various embodiments.

In one or more of the various embodiments, model 400 may have five objects: GL 402, Servers 404, Storage 410, Support 414, and Business Units 420. In one or more of the various embodiments, each object in data models contains or references a set of resource cost line items. For example, GL 402 includes resource cost line items for Payroll, Taxes and Rent. Likewise, Support 414 includes resource cost line items Email, Printers, Telephone, and Parking. In one or more of the various embodiments, each resource cost line item has one or more associated resource values. For example, Storage 410 has two resource cost line items, D1, and D2 (e.g., disk drives) having associated resource cost values of $1000 each.

Allocation rules may be used to connect objects of data model 400. In one or more of the various embodiments, allocation rules may show how resources flow between the objects modeled by data model 400. Resulting in a graph where the objects may be represented as nodes and the allocation rules may be represented as edges. In one or more of the various embodiments, generally a data model may be represented by a directed acyclic graph but that is not a requirement for an operative model. In one or more of the various embodiments, a model graph may contain cycles that are resolved or estimated using mathematical techniques, including but not limited to Gaussian elimination, Cholesky decomposition or Newton's method.

In one or more of the various embodiments, data models may be arranged to be stored in self-referential database such that some or all of the data objects for a data model may be stored in the same table. Accordingly, different records in the table may be arranged to include references to other records in the same table that also represent data model objects for a data model. Accordingly, in some embodiments, the graph structure of a data model may be represented in a single table rather than require normalized databased tables. Accordingly, in some embodiments, the performance of one or more processors, such as, processor 302 is improved because data models may be traversed by scanning through a single table rather than having to execute slower performing database query joins that may consume more processor resources or memory resources, or the like.

In one or more of the various embodiments, allocation rule 406 represents a rule allocating 20% of the resources of object GL 402 (source object) to Servers object 404 (target object). In this example, GL 402 includes resources values at $20,000, thus 20% of $20,000 (e.g., $4,000) flows based on allocation rule 406 to Servers 404. Likewise, allocation rule 408 may allocate $2,000 from GL 402 to Storage 410. The other allocation rules in data model 400 allocate 100% of the resource to the next data object: allocation rule 412 directs 100% of the resources (e.g., $4,000) to flow to Support 414; allocation rule 418 directs 100% of the resources in Support (e.g., $4,000) to flow to Business Units 420; and allocation rule 416 directs 100% of the resources from Storage 410 to flow to Business Units 420.

In one or more of the various embodiments, resources that flow into a data object may be allocated among the included resource cost line items. In one or more of the various embodiments, each object may have one or more rules that may describe how resources (e.g., assignment ratios) coming into to a data object are allocated or assigned to resource cost line items. In this example, for data objects 404, 410, 414, and 420, simple allocation rules assign the resources in the object evenly among the resource cost line items comprising each data object. Each may have its own allocations rules and assignment ratios, for example, GL 402 in this non-limiting example, the assignment ratio for resource cost line items may be 50% to Payroll, 25% to Taxes, and 25% to Rent.

In one or more of the various embodiments, an assignment ratio may represent how the resources in an organization may be assigned to the actual resource cost line items. In one or more of the various embodiments, allocation rules may be executed to distribute the resources based on definitions provided by the users or administrators who designed the data model. In one or more of the various embodiments, the assignment ratios and allocation rules may be modified as part of the modeling process.

The data model 400 is a simplified model useful for facilitating discussion and understanding of the embodiments. Allocation rules for models of large organizations can be numerous and complex. However, model 400 is at least sufficient to enable one of ordinary skill in the art to practice what is claimed herein.

Figure 5:
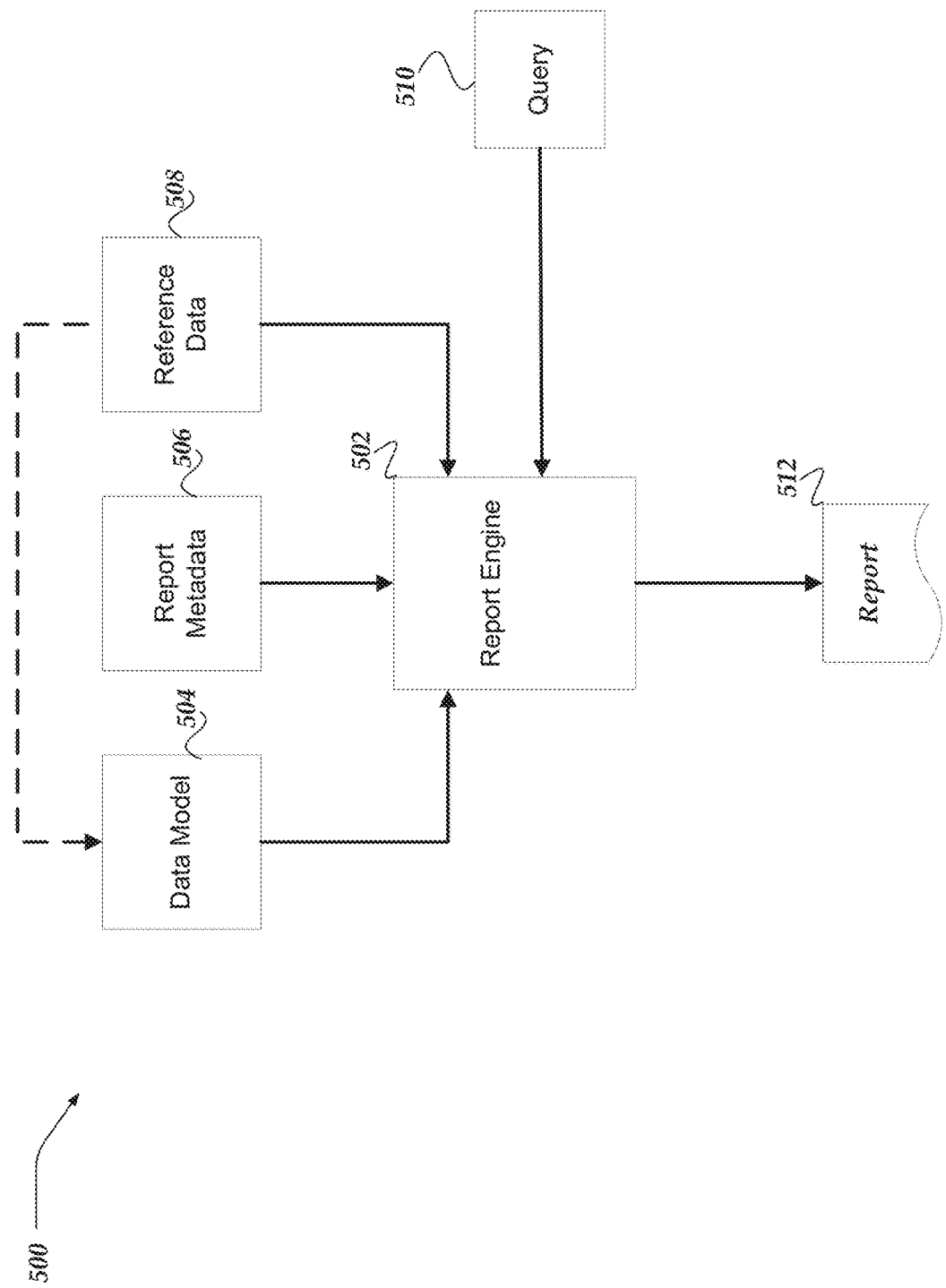
FIG. 5 illustrates a logical architecture of a system for tracking and viewing data model changes based on time in accordance with one or more of the various embodiments.

FIG. 5 illustrates a logical architecture of system 500 for tracking and viewing data model changes based on time in accordance with one or more of the various embodiments. In one or more of the various embodiments, system 500 may include report engine 502, data model 504, report metadata 506, reference data 508, queries 510, or the like, that provide one or more reports (interactive graphic based or otherwise).

In one or more of the various embodiments, data model 504 may define the arrangement of data objects, allocation of resources among the objects, or the like. Data model 504 may be arranged to reference one or more reference objects that may be stored in reference data 508. Reference objects may represent various tangible or intangible entities that comprise and organization.

In one or more of the various embodiments, reference data 508 may be based on one or more raw data sets that may be ingested by a modeling platform. Accordingly, in some embodiments, reference objects may include persons, places, or things that comprise the organization. Reference objects may include projects, computers, employees, contractors, locations, business units, products, network devices, or the like. Generally, in some embodiments, reference objects are used to provide contents for data models. For example, if a data model, such as, data model 400 is modeling resource allocations, the some or all data objects or object line items may correspond to reference objects that provide or consume resources in the data model.

In one or more of the various embodiments, reference data, such as reference data 508 may represent a large amount of data and objects. For example, a large organization with 1000s of employees, millions of network devices, hundreds of locations, and so on, may require a like number of reference objects each with many properties.

In this example, queries 510 represents various queries, questions, or the like, that may be provided to a report engine to select or generate results that may be used to populate one or more reports. For example, in some embodiments, an employee salary report may be associated with one or more queries that a report engine may execute against data model 504 and reference data 508 to fill in the values for the report. In some embodiment, report metadata 506 may provide report layout information, or the like, used to present or display the report.

In one or more of the various embodiments, various objects used by a modeling platform may be associated with one or more validity ranges that define time periods that a particular object, object property, rule, or the like, is valid. Accordingly, in one or more of the various embodiments, queries may include a time expression that may be used to select objects pinned to provided validity ranges. Thus, in one or more of the various embodiments, the query may provide results that include the version of the objects or items applicable to provide time.

In one or more of the various embodiments, validity ranges may be enforced without losing access to past validity ranges. Accordingly, in one or more of the various embodiments, the same query may be repeated just with different time expression to produce results that enable changes that impact the data model or reports to be explored by adjusting the time expression that is used in a query.

In one or more of the various embodiments, for any specific time, each item or object in the reference data or data model may have one validity range. Accordingly, if a query includes a particular validity time, it may be provided a single version of the object is it looking for—the version that corresponds to the validity time. In some embodiments, a query may include more than one validity time or a range of time, such queries may return more the one version of objects that have validity ranges that correspond to the query.

Also, in one or more of the various embodiments, validity ranges for different object or items may be different. In some embodiments, it may be expected or common that most reference data may remain relatively static (e.g., unchanged) changing rarely or slowly. For example, in some embodiments, an organization's employees may experience constant change, but on the whole most employee information may stay the same or change slowly or rarely. Likewise, for example, computer used by an organization or department may slowly change as older computers are retired and new ones are brought online, but at any given point in time the changes are few.

Accordingly, associating validity ranges with data objects, reference objects, items, rules, or the like, enable multiple versions of data models to be captured without having to store or archive entire reference data store or data models. For example, absent validity ranges, keeping different versions of data models requires keeping full copies of entire reference data stores. For large organizations, keeping complete versions of reference data may be prohibitively expensive. Operationally versioning by-snapshot may be difficult or ineffective, since full version snapshots may be time consuming to create, move, restore, archive, or the like, organizations will attempt to do so judiciously. However, for snapshot versioning to be effective, the organization will have to apply versioning polices that anticipate which versions will be needed in the future. Clearly, an error prone process, that may break down if the versioning policies of the past are not sufficient or compatible with the current needs of the organization.

Also, in some cases, organizations using snapshot based versioning may still require the ability to compare different versions of data models (with supporting reference data). Accordingly, queries associated with the comparison may have execute separately for each version. Also, in some cases, prior version snapshots may be associated with database systems or other tools that are incompatible with the database systems or other tools that are in use for more recent or current versions of the data model—making version comparison impossible or impractical.

Figure 6:
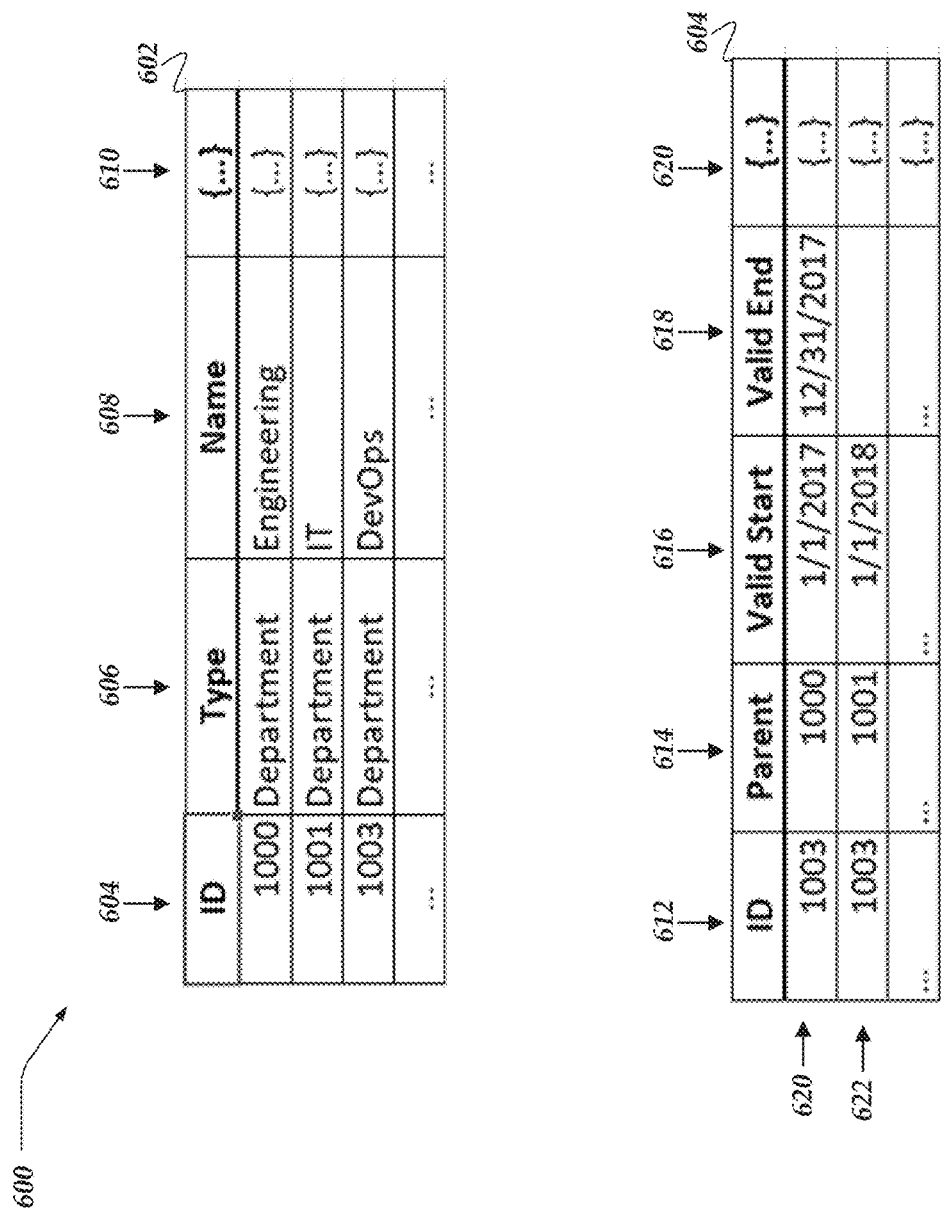
FIG. 6 illustrates a logical representation of a system that includes data structures for tracking and viewing model changes based on time in accordance with one or more of the various embodiments.

FIG. 6 illustrates a logical representation of system 600 that includes data structures for tracking and viewing model changes based on time in accordance with one or more of the various embodiments. In one or more of the various embodiments, modeling platforms may be arranged to employ various data structures to perform one or more actions for tracking and viewing model changes based on time. In this example, data structure 602 and data structure 604 are arranged to track and represent object dependencies. In some embodiments, data structure 602 may be used to define the identities of some or all objects in the modeling platform. Accordingly, in one or more of the various embodiments, data structure 602 may include column 604 for storing an identifier for an object, column 606 for storing type information that describes the type object, column 608 for storing a name of the objects, and column 610 represent additional columns that may be included depending on the specific application. In some embodiments, a data structure for establishing system-wide identifiers for objects may be reduced to just an identifier. Likewise, in some embodiments, a type column may be omitted or separate data structure may be provided for different types of objects. Here, the type and name columns are shown in the data structure to help clarify the description herein.

Accordingly, in this example, data structure 602 shows a few departments of an organization, including, Engineering, IT (information technology), and DevOps. Clearly, organizations may have fewer, more, or different departments than shown here. However, for one of ordinary skill in the art, the three departments shown are at least sufficient to disclose the innovation included herein.

In one or more of the various embodiments, modeling platforms may be arranged to associate a validity range with some or all objects associated with an organization or data model. In this example, for one or more of the various embodiments, data structure 604 may be arranged to track changes that may occur in an organization. In this example, data structure 604 includes various columns, such as: column 612 for storing identifiers of the objects that may be associated with a property change (these ID values correspond with the values in column 605 of data structure 602); column 614 identifies the ID of a parent object for the object corresponding to the ID in column 612; column 616 stores the start of the validity range that is associated with the object identified in column 612; column 618 stores the validity end of the validity range that is associated with the object identified in column 612; column 620 represents one or more additional columns that may vary depending on the specific application being modeled.

In one or more of the various embodiments, each time a dependency is modified in the model, it the modeling engine may generate new entry in data structure 604. In some embodiments, each entry in data structure 604 represents a change in dependency for an object listed in data structure 602. In some embodiments, each of these change entries may be associated with a validity range defined values in column 616 (validity start) and values in column 618 (validity end).

In one or more of the various embodiments, queries for reports related to parent-child dependencies may include a validity time expression. Accordingly, in some embodiments, the validity time may be used to identify with dependency relationship should be included in the result set.

In this example, there are three departments highlighted, Engineering, IT, and DevOps. Row 620 of data structure 604 shows that the object with ID=1003 has a parent object having ID 1000. This can be resolved as showing that DevOps is under the Engineering. However, in this example, row 622 shows that DevOps is under IT rather than Engineering. An examination of the validity range associated with these entries provides visibility (and record) of what happened in the organizations. Here, in this example, the value in column 616 for row 620 shows that as of Jan. 1, 2017 the parent of DevOps was Engineering. The value in column 618 for row shows that row 620 is only valid from Jan. 1, 2017 to Dec. 31, 2017.

Looking further at data structure 604, row 622 shows that DevOps is under the IT department rather than Engineering. And, column 618 for row 622 shows that the validity range for this record is Jan. 1, 2018. Accordingly, as of Jan. 1, 2018 DevOps is part of IT rather than Engineering.

According, in one or more of the various embodiments, based on data structure 602 and data structure 604, a report that shows the departments that are under Engineering will have different results for Jan. 1, 2017 through Dec. 31, 2017 than for Jan. 1, 2018 and beyond.

Figure 7:
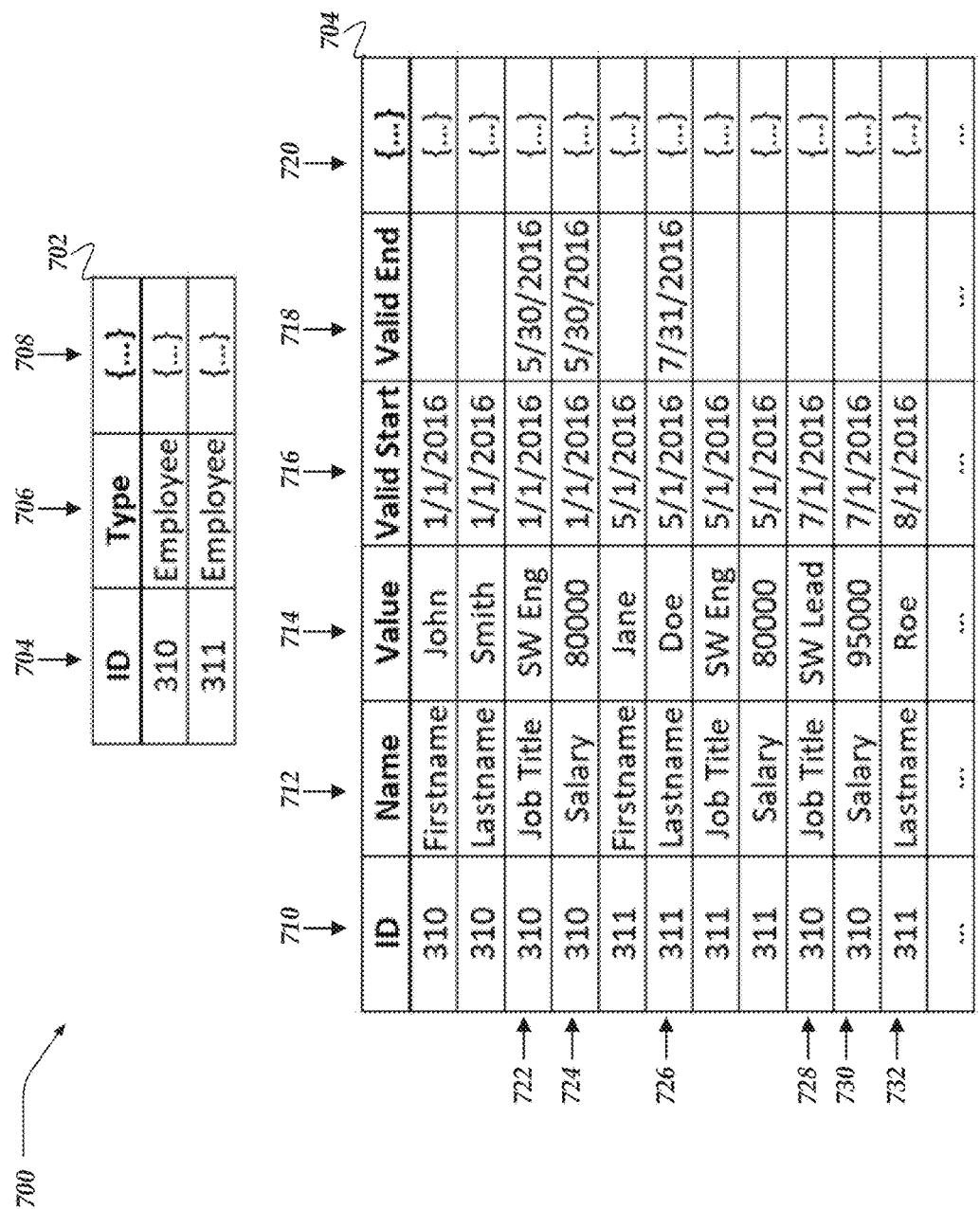
FIG. 7 illustrates a logical representation of a system that includes data structures for tracking and viewing model changes based on time in accordance with one or more of the various embodiments.

FIG. 7 illustrates a logical representation of system 700 that includes data structures for tracking and viewing model changes based on time in accordance with one or more of the various embodiments. In one or more of the various embodiments, data structure 702 may be considered the same or similar to data structure 602, except here it is storing identities that represent employees of an organization. Accordingly, column 704 stores IDs of objects, column 706 stores the type of object (included here to at least provide context to the reader), and column 708 represents additional columns that may be included in the data structure depending on the specific needs of a given application.

In one or more of the various embodiments, some or all properties or values associated with data objects, reference objects, or the like, may be stored in a data structure, such as, data structure 704. In this example, for some embodiments, data structure 704 may be arranged to include columns, including, column 710 for storing object IDs, column 712 for storing property names, column 714 for storing property values, column 716 for storing validity start times, column 718 for storing validity end times, and column 720 represents additional columns that may be included in the data structure depending on the specific needs of a given application.

In this example, in data structure 704, column 712 and column 714 represent a name-value pairs used to define property values for an object. Column 716 and column 718 represents a validity range for the property for the object.

In this example, data structure 702 includes IDs for two employees and data structure 704 include some property name-value pairs for those two employees. Each property name-value pair in data structure 704 is associated with an object ID and a validity range. For example, row 722 defines the job title for the employee with ID 310. And, row 224 defines the salary for the employee with ID 310 (e.g., John Smith).

Also, in this example, row 722 and row 724 include validity ranges. Here, row 722 shows that John Smith's Job Title is SW Eng (e.g., software engineer). And, row 724 shows that John Smith's Salary is $80000. Also, of note, these property values are valid from Jan. 1, 2016 to May 30, 2016 based on the validity ranges for row 722 and row 724 as defined by column 716 and column 718. Further, in this example, row 728 and row 730 show that John Smith's Job Title changed to SW Lead and his salary changed to $95000. These values have a validity range that begins on Jul. 1, 2017.

Similarly, data structure 704 at row 726 and row 732 shows that the last name for employee 311 (Jane Doe) was changed on Aug. 1, 2016. Accordingly, during the time period defined by the validity range defined in row 726, employee 311 had a last name of Doe from May 1, 2016 (which may represent her hire date) through Jul. 31, 2016, and from Aug. 1, 2016 onward her last name is Roe.

In one or more of the various embodiments, tracking objects or properties using validity ranges enables queries to retrieve the correct objects and object properties values for a given point-in-time. Data structures, such as, data structure 702 and data structure 704 enable the changes to be recorded without requiring a snapshot backup to be made of the data model or reference data to preserve previous versions. In this example, to maintain the history or past versions of the objects, it would require several complete backups to support analysis of past data sets. For example, a first backup would be required before employee ID 310 (John Smith) was hired, a second backup would be required when employee ID 311 (Jane Roe) was hired, a third backup would be required when John Smith was promoted, and a fourth backup when Jane Doe changed her last name to Roe. Clearly, absent the innovations disclosed herein, even in this small simplified example, maintaining searchable/queryable data that accurately reflects the state of the data model or reference data at particular point-in-time is difficult to accomplish without storing many versions of the databases. For complex or hyper-scale real-world data models and reference data, it is practically impossible to store archives for every change.

In some cases, systems may implement change logs or change journals that document each change or update to avoid archiving the entire date set upon each change, but change logs or change journals generally operate outside of the data store, in the sense that they often are viewed or searched separately from the underlying data store. While some systems may provide tools to automatically interpret change logs to rollback changes in a data store, the rollback operation will often require modification the current version of the data store unless they are applied against a clone or archived copy.

In contrast, in one or more of the various embodiments, the innovations disclosed herein enable a report engine to provide reports that accurately reflect the state of the data model or reference data as it was at a specific point-in-time without requiring copies or archives of the underlying the entire data sets. This improves performance of computers, processors, and memory by enabling much smaller memory footprints, reduced storage footprints, and faster searching or querying. Smaller storage footprints are obtained by eliminating the need for archives or backups of the data model or reference data. Likewise, in some embodiments, improved processor performance is at least gained by enabling queries against smaller datasets. Improvements are also realized by reducing the complexity and performance cost of backward (in time) looking queries because there is no longer a requirement to rollback data using change log entries before executing the backward-looking queries, and so on.

Figure 8:
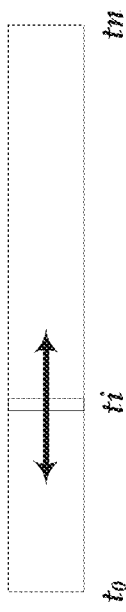
FIG. 8 illustrates a logical representation of a report for enable interactive analysis of data models that employ tracking and viewing model changes based on time in accordance with one or more of the various embodiments.

FIG. 8 illustrates a logical representation of report 800 for enable interactive analysis of data models that employ tracking and viewing model changes based on time in accordance with one or more of the various embodiments. As mentioned above, reports generated or provided by report engines, such as report engine 324 may be interactive reports displayed using graphical user-interfaces enable users to dynamically provide or adjust input parameters that are translated into queries that are executed to update the values shown in the report.

In this example, control 802 represents a slider control that enables a user to select a time of interest by moving slider thumb 804. In this example, moving thumb 804 to the left decreases the point-in-time value of interest and moving it to the right increases the point-in-time interest. In some embodiments, changing the position of thumb 804 may trigger a report engine to query for data that corresponds to the point-in-time interest indicated by the thumb position. Naturally, in one or more of the various embodiments, other user-interface controls, such as, spin dials, text fields, select lists, or the like, may be used.

In this example, for some embodiments, grid control 806A shows reports values at one point in time and grid control 806B shows reports values at another point in time. Accordingly, a user may manipulate slider 802 to discover at one point in time there were three SW Leads and later in time there are four. Referring back to FIG. 7, grid control 806A may represent the state of the data model before Jul. 1, 2016 and grid control 806B may represent the state of the data model on or after Jul. 1, 2016. As described above, by leveraging the innovations disclosed herein this type of analysis or comparison may occur without using archived data sets, multiple databases, or other expensive methods.

Figure 9:
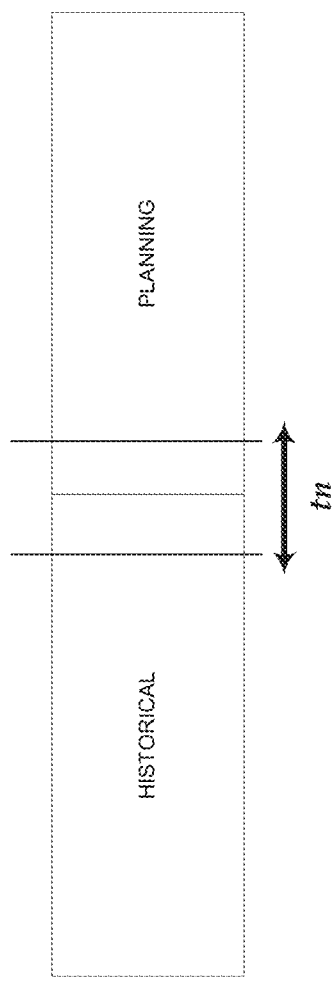
FIG. 9 illustrates a logical representation of a data model that is used to describe interactive analysis of data models that employ tracking and viewing model changes based on time in accordance with one or more of the various embodiments.

FIG. 9 illustrates a logical representation of data model 900 that is used to describe interactive analysis of data models that employ tracking and viewing model changes based on time in accordance with one or more of the various embodiments. In one or more of the various embodiments, modeling engines, such as modeling engine 322 may be arranged to enable users to plan for future resource needs or resource allocations. In one or more of the various embodiments, modeling engine 322 also enables users to perform various what-if analysis that may include evaluating the potential impact of planned or future changes to the data model, reference data, allocation rules, or the like.

In one or more of the various embodiments, data set 902 used by a modeling engine may be considered to be a comprised on historical data 904 and planning data 906. In some embodiments, historical data 904 may be considered to be events, resource distributions, resource consumption, actions, allocations, or the like, that have actually occurred and planning data 906 may be considered to be events, resource distributions, resource consumption, actions, allocations, or the like, that may be planned yet not actualized.

In one or more of the various embodiments, reports provided by a report engine may include user interfaces that enable the displayed report information to be updated dynamically as various point-in-time inputs are provided. (See, FIG. 8.) In some embodiments, a point-in-time, such as, point-in-time 908 may be a point-in-time that crosses over from historical time to planning time. Accordingly, in one or more of the various embodiments, if point-in-time 910 is selected, the report values may be based on queries into historical data such that report results may be based on data with a validity range the includes point-in-time 910. As the time input crosses point-in-time 908, the report engine may be arranged to automatically execute the report queries using the planned data. For example, if the time input shifts from point-in-time 910 to point-in-time 912 planning data that that has a validity range that include point-in-time 912 may be returned by the queries for use in the report.

In one or more of the various embodiments, data objects, reference objects, data model portions, reference data, or the like, that is not planned to change at point-in-time 912 may be shared with out duplication. Planning data that includes changes projected or planned to occur in the planning period may be associated with validity ranges that correspond to the planning periods. Also, in some embodiments, reports may be designed to distinguish between historical data, past planned data, future planned data, or the like, as needed for the particular visualization provided by the report. In some embodiments, one or more validity ranges associated with planning data or what-if scenarios may be tagged so if they overlap actual validity ranges the report engine may be enabled distinguish between the what-if data, actual data, or the like.

Generalized Operations

Figure 10:
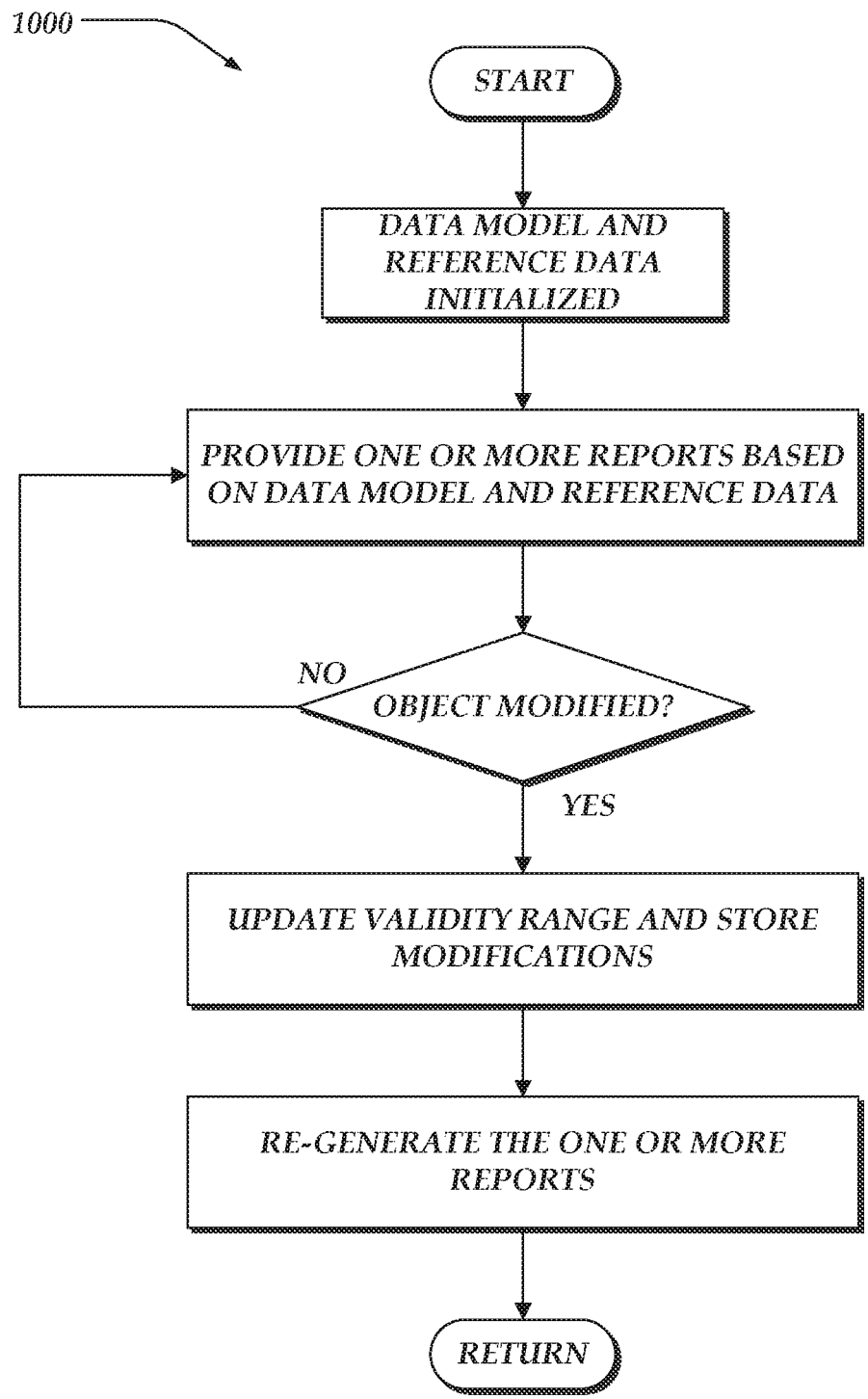
FIG. 10 illustrates an overview flowchart for a process for tracking and viewing model changes based on time in accordance with one or more of the various embodiments.
Figure 11:
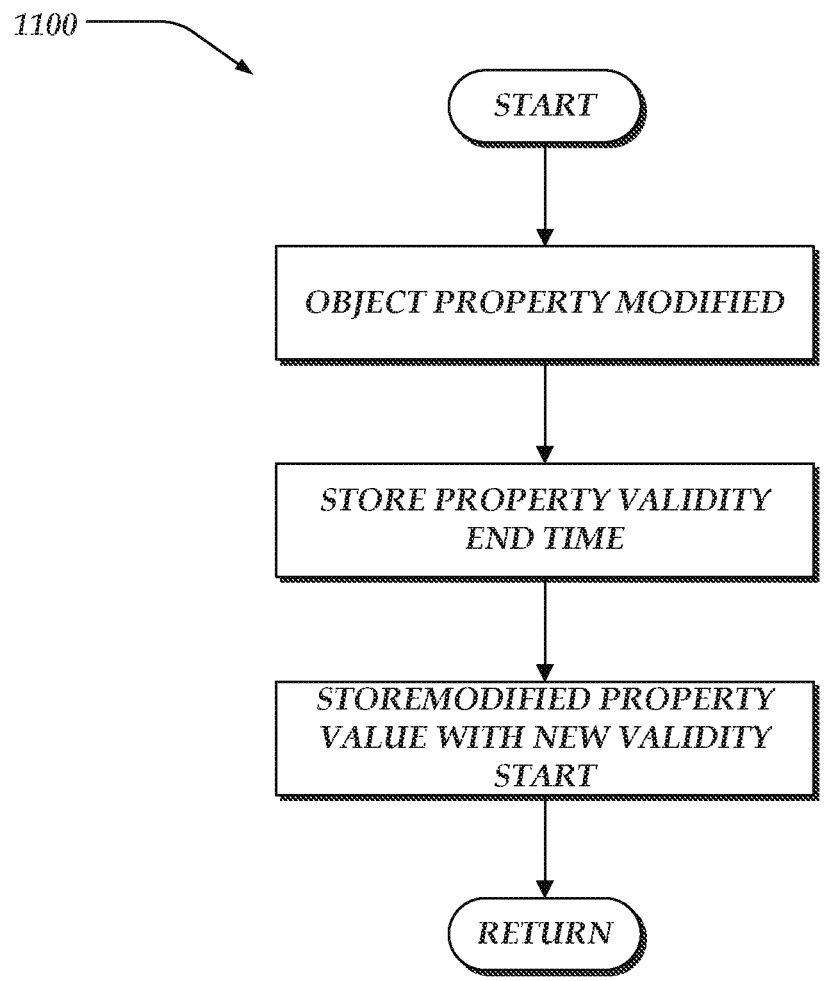
FIG. 11 illustrates a flowchart for a process for tracking object property changes based on time in accordance with one or more of the various embodiments.
Figure 12:
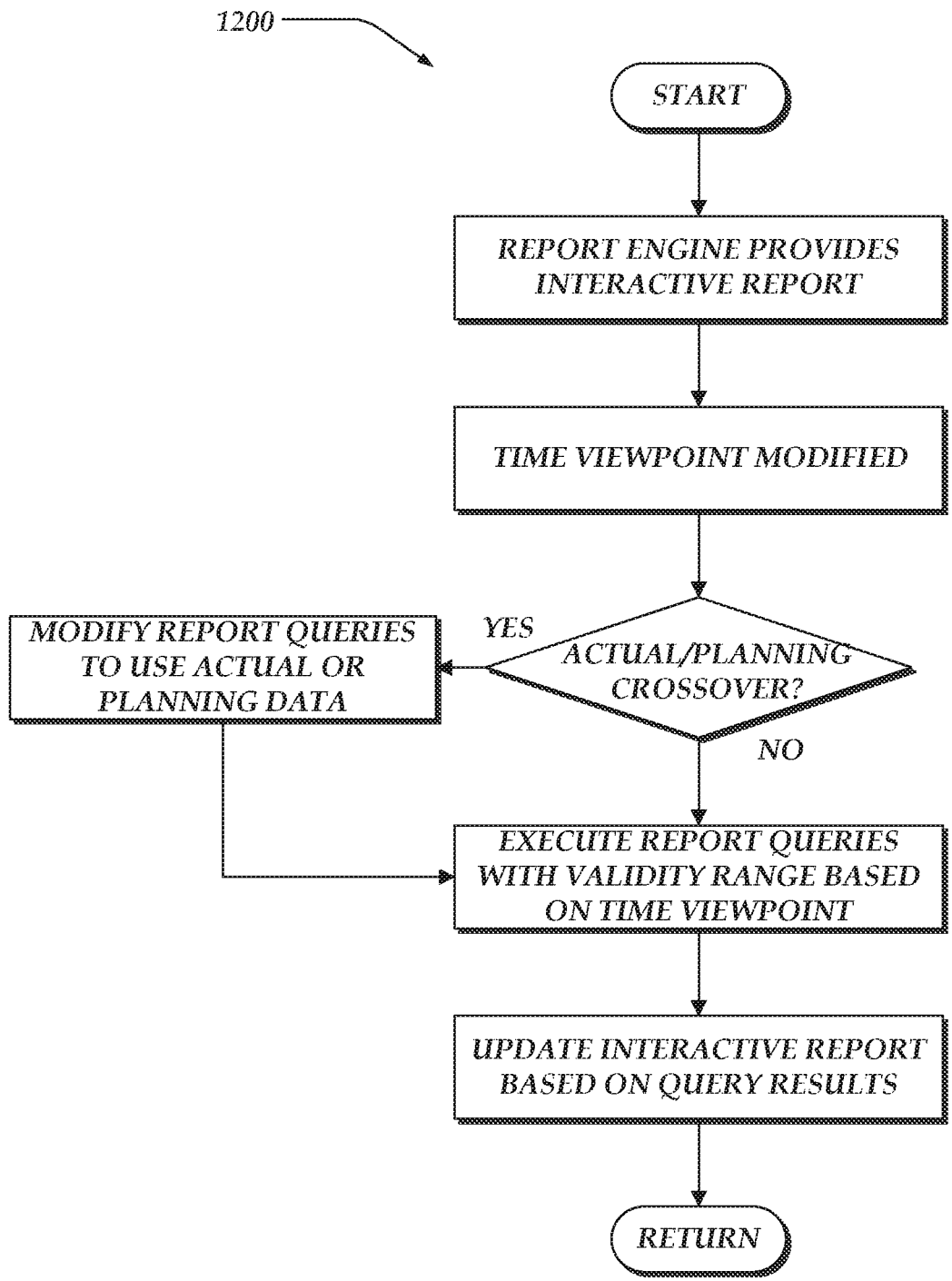
FIG. 12 illustrates a flowchart for a process for generating reports based on time in accordance with one or more of the various embodiments.

FIGS. 10-12 represent the generalized operations for tracking and viewing model changes based on time in accordance with one or more of the various embodiments. In one or more of the various embodiments, processes 1000, 1100, and 1200 described in conjunction with FIGS. 10-12 may be implemented by or executed on a single network computer, such as network computer 300 of FIG. 3. In other embodiments, these processes or portions thereof may be implemented by or executed on a plurality of network computers, such as network computer 300 of FIG. 3. However, embodiments are not so limited, and various combinations of network computers, client computers, virtual machines, or the like, may be utilized. Further, in one or more of the various embodiments, the processes described in conjunction with FIGS. 10-12 may be operative in resource modeling and tracking and viewing model changes based on time such as described in conjunction with FIGS. 4-9.

FIG. 10 illustrates an overview flowchart for process 1000 for tracking and viewing model changes based on time in accordance with one or more of the various embodiments. After a start block, at block 1002, in one or more of the various embodiments, a modeling platform that includes a modeling engine, such as, resource modeling engine 322 may be arranged to initialize one or more data models, data objects, reference data, allocations rules, or the like. In one or more of the various embodiments, one or more raw data sets may be ingested to provide reference data. Also, in some embodiments, one or more data models may be generated based on the reference data, allocations rules, or the like, to model the production, allocation, distribution, consumption, or the like, of various resources within or associated with an organization.

At block 1004, in one or more of the various embodiments, a report engine may provide one or more reports based the one or more data models and the reference data. In one or more of the various embodiments, modeling platforms may be arranged to enable users to view various reports that provide insights into production, allocation, distribution, consumption, or the like, of various resources within or associated with an organization. In some embodiments, reports may be static or interactive. Likewise, in some embodiments, reports may be designed to displayed on hardware compute displays or printed on paper. In some embodiments, reports may be considered interactive displays that are integrated with various user-interface elements, inputs, or controls that enable users to dynamically interact with one or more values included in a report. Likewise, in some embodiments, reports may enable users to provide or modify one or more query parameters that are used in the queries that provide data for the one or more reports.

At decision block 1006, in one or more of the various embodiments, if one or more data models, data objects or reference objects are modified, control may flow to block 1008; otherwise, control may loop back to block 1004. In one or more of the various embodiments, modeling platforms may provide various mechanisms for modifying objects, such as, data models, data objects, reference data, allocation rules, or the like. In some embodiments, modeling engines may provide user-interfaces that enable users to interactively modify objects. In one or more of the various embodiments, modeling platforms may be arranged to provide machine or network interfaces that enable other programs, engines, services, or the like, to modify objects.

At block 1008, in one or more of the various embodiments, the modeling engine or report engine may be arranged to update validity ranges associated with the one or more modification to data models, data objects, reference objects, or the like. In one or more of the various embodiments, some or all objects associated with a data model or provided by a modeling platform may be associated with validity ranges that may be modified as changes to the objects are made. In some embodiments, changing values associated with objects (e.g., reference object property values, or the like) may cause new records that are associated with their own validity ranges while the previous values may be retained and associated with their own validity range.

At block 1010, in one or more of the various embodiments, the report engine may re-generate the one or more reports based on the modifications made to the one or more data models, data objects, or reference objects. Reports may be associated with or based on one or more queries. The queries may employ a selected or provided point-in-time to select object 'versions' that have validity ranges that include or contain the selected point-in-time.

In one or more of the various embodiments, reports may be arranged to display data visualizations associated with a particular validity range. Accordingly, in some embodiments, if changes to an object are associated with a validity range associated with a report, one or more of those changes may be automatically updated in the current report. If the report is focused on validity range in the past, that is does not include any of the modifications the report may remain unchanged.

Next, control may be returned to a calling process.

FIG. 11 illustrates an overview flowchart for process 1100 for tracking object property changes based on time in accordance with one or more of the various embodiments. After a start block, at block 1102, in one or more of the various embodiments, a modeling engine may be arranged to modify one or more data models, data objects, reference objects, or the like. In one or more of the various embodiments, the modifications may include changing the values of existing properties, adding or removing properties, adding or removing objects, change object relationships in the data model, modifying allocation rules, or the like, or combination thereof. In some embodiments, modifications may be performed based on the execution of rule-based policies, user-input, configuration information, or the like, or combination thereof.

At block 1104, in one or more of the various embodiments, the modeling engine may be arranged to update the validity end time that is associated with modifications. In one or more of the various embodiments, the modifications may be associated with one or more properties of one or more objects, or the like. Accordingly, in one or more of the various embodiments, the validity range of the current values may be closed. For example, in one or more of the various embodiments, the modeling engine may set a validity end time for the affected objects.

In one or more of the various embodiments, the validity end time may be set to the current time, or the time that the modifications are committed to the data store.

In some embodiments, the modifications to the objects may be scheduled to be applied in the future. Accordingly, in these circumstances the validity end time may be set to the time the change is intended to come into force. Likewise, in some embodiments, the modifications may be corrections or edits that require the validity end times to be set in the past.

At block 1106, in one or more of the various embodiments, the modeling engine may be arranged to provide one or more new records that have a validity start time corresponding to the modifications. As described above, in FIG. 6 or FIG. 7, modifications to objects associated with validity ranges result in new records being entered into data structures associated with properties being modified. The new records store the modification and set a validity start time that is associated with the modifications.

In one or more of the various embodiments, the validity start time may be set to the current time, or the time that the modifications are committed to the data store.

In some embodiments, the modifications to the objects may be scheduled to be applied in the future. Accordingly, in these circumstances the validity start time may be set to the time the change is intended to come into force. Likewise, in some embodiments, the modifications may be corrections or edits that require the validity start time be set in the past.

In one or more of the various embodiments, storing the modifications and updates related to the validity ranges may be performed as atomic operations that ensure the validity ranges and object values remain consistent. The particular transaction or synchronization mechanism employed may vary depending on the underlying data store or database. Next, control may be returned to a calling process.

In one or more of the various embodiments, a report engine may determine one or more queries for report. In some embodiments, one or more reports may be associated with queries that are executed to populate the reports. In some embodiments, one or more parameters to the queries may be provided using configuration information, user information, user input, geographic/localization information, or the like, or combination thereof.

In one or more of the various embodiments, reports may be associated with report metadata that may include or reference the one or more queries used for populating a report. The queries may be provided using a query language targeted towards specific database platforms (e.g., SQL). Also, in some embodiments, queries may be stored using a generic query language that the report engine may translate or map to the query language associated with a particular database platform.

In one or more of the various embodiments, a point-in-time value may be provided for one or more of the queries. In one or more of the various embodiments, point-in-time values may default to the current time the query is executed. In some embodiments, point-in-time values may be provided via user-interfaces (e.g., FIG. 8), configuration information, rule-based policies, report metadata, or the like, or combination thereof.

In one or more of the various embodiments, point-in-time value may be represented using a date-time format compatible with the target database platform. In some embodiments, the report engine may translate or map the point-in-time value to a date-time format that is compatible with the query language or the database or data store being used.

In one or more of the various embodiments, the point-in-time value may be provided as a parameter to one or more stored procedures that correspond to the queries. Likewise, in one or more of the various embodiments, the point-in-time value may be provided as a parameter of the query.

In one or more of the various embodiments, the report engine may execute the one or more queries to provide results based on the point-in-time value and the validity ranges associated with data models, data objects, reference data, reference objects, or the like, that may be involved in query. In one or more of the various embodiments, the report engine may submit the queries to a data store or database by one or more methods, including, direct submission, via a software library, API, remote/network interfaces, or the like, combination thereof.

In one or more of the various embodiments, the report engine may provide the one or more reports or report values based on the data provided by the queries. In one or more of the various embodiments, the report engine may be provided result sets in response to the provided queries. The report engine may select data from the result sets for formatting and display in the reports. Next, control may be returned to a calling process.

FIG. 12 illustrates an overview flowchart for process 1200 for generating reports based on time in accordance with one or more of the various embodiments. After a start block, at block 1202, in one or more of the various embodiments, a report engine may provide one or more reports. As described above, reports may be provided for users upon selection or demand. Also, in one or more of the various embodiments, report engines may be configured to automatically provide one or more reports for automatic display or access, including for reports for display on kiosks, report for display GUI dashboards, reports provided in response to one or more conditions or triggers (as defined by one or more rule-based policies, or the like) reports that may be linked with or included with automatic alerts or notifications, or the like. In some embodiments, as users navigate through an application, one or more reports associated with the application may be generated.

At block 1204, in one or more of the various embodiments, the point-in-time value associated with the one or more reports may be modified. The modifications may be provided based on the execution of one or more rules, configuration information, or the like. For example, a report may be configured to update itself every five minutes. Accordingly, in this example, the point-in-time value may be automatically updated by the report engine every five minutes. In other embodiments, the point-in-time value may be updated based on user-input, or the like. See, FIG. 8.

At decision block 1206, in one or more of the various embodiments, if the point-in-value crosses over the historical data/planning line; control may flow to block 1208; otherwise, control may flow to block 1210.

At block 1208, in one or more of the various embodiments, in some cases, the point-in-time value used for queries associated with a report may transition from the time periods associated with historical data into time periods associated with planning data, or vice versa. See, FIG. 9. Accordingly, in one or more of the various embodiments, one or more of the queries associated with the report may be modified to use historical data if the point-in-time value is in a time period associated with the historical data. Likewise, in some embodiments, one or more of the queries associated with the report may be modified to use planning data if the point-in-time value is in a time period associated with the planning data.

In one or more of the various embodiments, both historical and planning data may be included the same data store where they may be distinguished from each other based on their associated validity ranges. In some embodiments, validity ranges corresponding to the past may be associated with historical data and validity ranges corresponding to the future may be associated with planning data.

At block 1210, in one or more of the various embodiments, the report engine may execute the one or more queries using the modified point-in-time value. In one or more of the various embodiments, queries directed to data associated with validity ranges may be provided a parameter that represents the point-in-time value that should be used to determine validity ranges that match the query. Accordingly, the report engine may execute or issues the queries associated with the report and provide the point-in-time value of interests.

At block 1212, in one or more of the various embodiments, the report engine may update the report based on the new query results. In one or more of the various embodiments, the report engine may be arranged to automatic update report results as the result sets change. In some embodiments, some reports may be updated upon the expiry of a timer, or other automatic mechanism. Also, in some embodiments, some reports may be designed to require users to trigger a refresh of the report rather than automatic updating.

Next, control may be returned to calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing changes to data using a computer that includes one or more hardware processors, where each step of the method is performed by the one or more hardware processors, comprising:
   instantiating a modeling engine to perform actions, including:
      providing a data model that is based on one or more objects, wherein each object is comprised of one or more versions of one or more properties, and wherein the one or more versions of each property are stored in a same data structure in a same data store;
      associating each version of the one or more properties with separate validity time ranges during which each version is valid, wherein each separate validity time range for each version of a same property are disjoint from each other validity time range of the same property;
      employing the separate validity time ranges to store an amount of reference data associated with each version of the same property, which optimizes a minimum amount of reference data stored in the data store to capture each version of the data model without having to also store full copies of reference data associated with each version of the data model or each version of the one or more objects;
      receiving a new property value for a latest version of the property;
      associating an end time that corresponds to the receipt of the new property value with the latest version of the property, wherein the end time indicates an end of a validity time range that is associated with the latest version of the property;
      providing a new version of the property that has the new property value; and
      associating a start time with the new version of the property, wherein the start time is adjacent in time to the end time and it indicates a start of a validity time range for when the new version of the property is valid; and
   instantiating a report engine to perform further actions, including:
      providing a report for visualizing one or more portions of the data model at a point-in-time;
      providing one or more report values based on each version of the one or more properties associated with a validity time range that includes the point-in-time; and
      displaying the report on a hardware display, wherein the report provides one or more visualizations based on the one or more report values.

2. The method of claim 1, further comprising:
   providing one or more other report values based on other versions of the one or more properties associated with one or more other validity time ranges that are valid at another point-in-time; and
   automatically updating the display of the report based on the one or more other report values.

3. The method of claim 1, wherein the modeling engine performs further actions, including:

providing the one or more versions of the one or more properties based on historical data; and providing one or more other versions of the one or more properties based on planning data, wherein the one or more portions of the historical data and the planning data are stored in the same data store and distinguished from each other by disjoint validity time ranges.

4. The method of claim 1, wherein the report engine performs further actions, comprising:

providing one or more queries that are associated with the report;

modifying the one or more queries by including the point-in-time in the one or more queries; and employing the one or more queries to provide one or more values associated with the one or more versions of the one or more properties, wherein the one or more values are associated with a validity time range that includes the point-in-time.

5. The method of claim 1, wherein displaying the report, further comprises, including one or more of date formats, time formats, units, colors, fonts, punctuation, time zones, languages, currencies, or calendar formatting based on geolocation information provided by one or more sensors associated with a computer.

6. The method of claim 1, wherein the modeling engine performs further actions, including:

allocating a first portion of computer memory to store each new version of a property of an object;

preserving second portion of computer memory that stores prior versions of the property of the object; and preserving a third portion of computer memory that stores each version of one or more other properties of the object.

7. A system for managing changes to data, comprising:

a network computer, comprising:

a transceiver that communicates over the network;

a memory that stores at least instructions; and one or more processor devices that execute instructions that perform actions, including:

instantiating a modeling engine to perform actions, including:

providing a data model that is based on one or more objects, wherein each object is comprised of one or more versions of one or more properties, and wherein the one or more versions of each property are stored in a same data structure in a same data store;

associating each version of the one or more properties with separate validity time ranges during which each version is valid, wherein each separate validity time range for each version of a same property are disjoint from each other validity time range of the same property;

employing the separate validity time ranges to store an amount of reference data associated with each version of the same property, which optimizes a minimum amount of reference data stored in the data store to capture each version of the data model without having to also store full copies of reference data associated with each version of the data model or each version of the one or more objects;

receiving a new property value for a latest version of the property;

associating an end time that corresponds to the receipt of the new property value with the latest version of the property, wherein the end time indicates an end of a validity time range that is associated with the latest version of the property;

providing a new version of the property that has the new property value; and associating a start time with the new version of the property, wherein the start time is adjacent in time to the end time and it indicates a start of a validity time range for when the new version of the property is valid; and instantiating a report engine to perform further actions, including:

providing a report for visualizing one or more portions of the data model at a point-in-time;

providing one or more report values based on each version of the one or more properties associated with a validity time range that includes the point in time; and displaying the report on a hardware display, wherein the report provides one or more visualizations based on the one or more report values; and a client computer, comprising:

a client computer transceiver that communicates over the network;

a client computer memory that stores at least instructions; and one or more processor devices that execute instructions that perform actions, including:

displaying one or more portions of the report.

8. The system of claim 7, further comprising:

providing one or more other report values based on other versions of the one or more properties associated with one or more other validity time ranges that are valid at another point-in-time; and automatically updating the display of the report based on the one or more other report values.

9. The system of claim 7, wherein the modeling engine performs further actions, including:

providing the one or more versions of the one or more properties based on historical data; and providing one or more other versions of the one or more properties based on planning data, wherein the one or more portions of the historical data and the planning data are stored in the same data store and distinguished from each other by disjoint validity time ranges.

10. The system of claim 7, wherein the report engine performs further actions, comprising:

providing one or more queries that are associated with the report;

modifying the one or more queries by including the point-in-time in the one or more queries; and employing the one or more queries to provide one or more values associated with the one or more versions of the one or more properties, wherein the one or more values are associated with a validity time range that includes the point-in-time.

11. The system of claim 7, wherein displaying the report, further comprises, including one or more of date formats, time formats, units, colors, fonts, punctuation, time zones, languages, currencies, or calendar formatting based on geolocation information provided by one or more sensors associated with a computer.

12. The system of claim 7, wherein the modeling engine performs further actions, including:

allocating a first portion of computer memory to store each new version of a property of an object;

preserving second portion of computer memory that stores prior versions of the property of the object; and preserving a third portion of computer memory that stores each version of one or more other properties of the object.

13. A processor readable non-transitory storage media that includes instructions for managing changes to data, wherein execution of the instructions by one or more hardware processors performs actions, comprising:
instantiating a modeling engine to perform actions, including:
providing a data model that is based on one or more objects, wherein each object is comprised of one or more versions of one or more properties, and wherein the one or more versions of each property are stored in a same data structure in a same data store;
associating each version of the one or more properties with separate validity time ranges during which each version is valid, wherein each separate validity time range for each version of a same property are disjoint from each other validity time range of the same property;
employing the separate validity time ranges to store an amount of reference data associated with each version of the same property, which optimizes a minimum amount of reference data stored in the data store to capture each version of the data model without having to also store full copies of reference data associated with each version of the data model or each version of the one or more objects;
receiving a new property value for a latest version of the property;
associating an end time that corresponds to the receipt of the new property value with the latest version of the property, wherein the end time indicates an end of a validity time range that is associated with the latest version of the property;
providing a new version of the property that has the new property value; and
associating a start time with the new version of the property, wherein the start time is adjacent in time to the end time and it indicates a start of a validity time range for when the new version of the property is valid; and
instantiating a report engine to perform further actions, including:
providing a report for visualizing one or more portions of the data model at a point-in-time;
providing one or more report values based on each version of the one or more properties associated with a validity time range that includes the point in time; and
displaying the report on a hardware display, wherein the report provides one or more visualizations based on the one or more report values.

14. The media of claim 13, further comprising:
providing one or more other report values based on other versions of the one or more properties associated with one or more other validity time ranges that are valid at another point-in-time; and
automatically updating the display of the report based on the one or more other report values.

15. The media of claim 13, wherein the modeling engine performs further actions, including:
providing the one or more versions of the one or more properties based on historical data; and
providing one or more other versions of the one or more properties based on planning data, wherein the one or more portions of the historical data and the planning data are stored in the same data store and distinguished from each other by disjoint validity time ranges.

16. The media of claim 13, wherein the report engine performs further actions, comprising:
providing one or more queries that are associated with the report;
modifying the one or more queries by including the point-in-time in the one or more queries; and
employing the one or more queries to provide one or more values associated with the one or more versions of the one or more properties, wherein the one or more values are associated with a validity range that includes the point-in-time.

17. The media of claim 13, wherein displaying the report, further comprises, including one or more of date formats, time formats, units, colors, fonts, punctuation, time zones, languages, currencies, or calendar formatting based on geo-location information provided by one or more sensors associated with a computer.

18. The media of claim 13, wherein the modeling engine performs further actions, including:
allocating a first portion of computer memory to store each new version of a property of an object;
preserving second portion of computer memory that stores prior versions of the property of the object; and
preserving a third portion of computer memory that stores each version of one or more other properties of the object.

19. A network computer for generating reports for managing changes to data, comprising:
a transceiver that communicates over the network;
a memory that stores at least instructions; and
one or more processor devices that execute instructions that perform actions, including:
instantiating a modeling engine to perform actions, including:
providing a data model that is based on one or more objects, wherein each object is comprised of one or more versions of one or more properties, and wherein the one or more versions of each property are stored in a same data structure in a same data store;
associating each version of the one or more properties with separate validity time ranges during which each version is valid, wherein each separate validity time range for each version of a same property are disjoint from each other validity time range of the same property;
employing the separate validity time ranges to store an amount of reference data associated with each version of the same property, which optimizes a minimum amount of reference data stored in the data store to capture each version of the data model without having to also store full copies of reference data associated with each version of the data model or each version of the one or more objects;
receiving a new property value for a latest version of the property;
associating an end time that corresponds to the receipt of the new property value with the latest version of the property, wherein the end time indicates an end of a validity time range that is associated with the latest version of the property;
providing a new version of the property that has the new property value; and
associating a start time with the new version of the property, wherein the start time is adjacent in time to the end time and it indicates a start of a validity time range for when the new version of the property is valid; and instantiating a report engine to perform further actions, including:

providing a report for visualizing one or more portions of the data model at a point-in-time;

providing one or more report values based on each version of the one or more properties associated with a validity time range that includes the point in time; and displaying the report on a hardware display, wherein the report provides one or more visualizations based on the one or more report values.

20. The network computer of claim 19, further comprising:

providing one or more other report values based on other versions of the one or more properties associated with one or more other validity time ranges that are valid at another point-in-time; and automatically updating the display of the report based on the one or more other report values.

21. The network computer of claim 19, wherein the modeling engine performs further actions, including:

providing the one or more versions of the one or more properties based on historical data; and providing one or more other versions of the one or more properties based on planning data, wherein the one or more portions of the historical data and the planning data are stored in the same data store and distinguished from each other by disjoint validity time ranges.

22. The network computer of claim 19, wherein the report engine performs further actions, comprising:

providing one or more queries that are associated with the report;

modifying the one or more queries by including the point-in-time in the one or more queries; and employing the one or more queries to provide one or more values associated with the one or more versions of the one or more properties, wherein the one or more values are associated with a validity time range that includes the point-in-time.

23. The network computer of claim 19, wherein displaying the report, further comprises, including one or more of date formats, time formats, units, colors, fonts, punctuation, time zones, languages, currencies, or calendar formatting based on geolocation information provided by one or more sensors associated with a computer.

24. The network computer of claim 19, wherein the modeling engine performs further actions, including:

allocating a first portion of computer memory to store each new version of a property of an object;

preserving second portion of computer memory that stores prior versions of the property of the object; and preserving a third portion of computer memory that stores each version of one or more other properties of the object.

* * * * *